Dec. 27, 1966    J. M. FOLZ    3,293,870
LOW PRESSURE STORAGE
Filed March 25, 1965
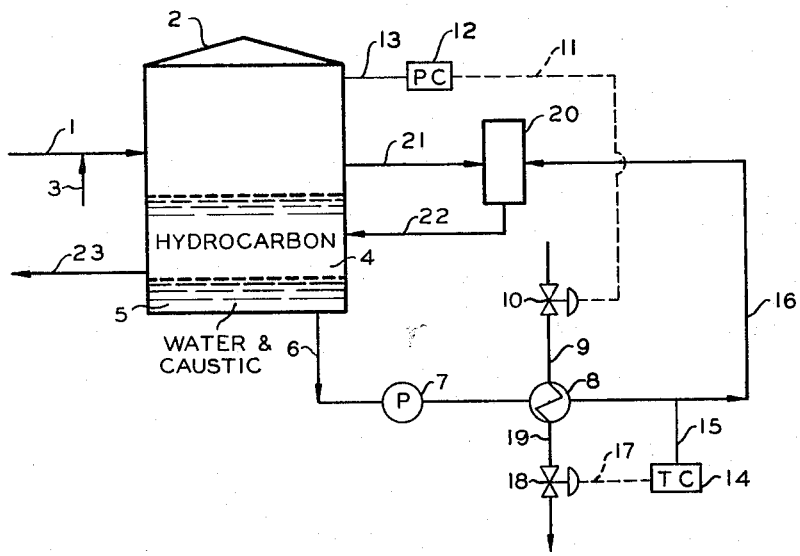
INVENTOR
J. M. FOLZ
BY *Young and Quigg*
ATTORNEYS United States Patent Office 3,293,870
Patented Dec. 27, 1966

3,293,870
LOW PRESSURE STORAGE
John M. Folz, Bartlesville, Okla., assignor to Phillips Petroleum Company, a corporation of Delaware
Filed Mar. 25, 1965, Ser. No. 442,594
9 Claims. (Cl. 62—45)

This invention relates to a method for storing mixtures of materials at low pressures. In one aspect this invention relates to a method for maintaining a low-pressure storage facility at a constant storage temperature.

Heretofore, when large quantities of a relatively volatile material have been stored, the stored material has been subjected to an elevated pressure in order to reduce to a minimum the amount of that material that volatilizes. Although the use of elevated pressures does reduce the volatilization tendency it also requires heavy duty and expensive apparatus to safely contain such pressures. Thus, it is desirable from a fiscal point of view to store these materials at relatively low pressures, i.e., less than about 1 p.s.i.g. However, in order to store these materials at low pressures it is necessary to reduce the temperature of storage in order to minimize the amount of volatilization of the stored material that occurs.

It has been found that oftentimes there is present in the stored material, e.g., a hydrocarbon, a second material, e.g., water, which tends to freeze at or above the storage temperature and therefore solidifies and blocks the apparatus related to the storage facility.

It has further been found that if there is added to this second material an additive material, e.g., an inorganic compound, which preferentially combines with the second material, in an amount which lowers the solidifying temperature of the second material, at least to the storage temperature, the entire amount of material stored and the apparatus related to this storage facility can be kept substantially free of any solidified second material and the storage facility maintained at the storage temperature by simply removing a part of the second material and combined additive from the stored material, cooling this removed part to a temperature substantially below the storage temperature, using this cooled part to condense vapors from the material in storage and returning both the condensed vapors and the cooled part to the material in storage. The rate of removal of the second material and combined additive and the degree of cooling of these materials below the storage temperature are adjusted so that the amount and temperature of the condensed vapors and the cooled materials returned to the materials in storage is sufficient to maintain these stored materials at the storage temperature notwithstanding a continuous removal of some of the stored materials for disbursement thereof or a continuous addition of warm materials to be stored or both. Of course, this invention can also be employed to maintain a fixed quantity of stored materials at a constant storage temperature.

Thus, it can be seen that by the practice of this invention low-pressure storage of volatile materials is effected even though a second material is present which tends to solidify or at least become viscous at the storage temperature. It can be further seen that this invention provides a single and economic substitute for more expensive systems necessary if this second material is to be removed before storage. Such systems include fractionation, dehydrogenation in the case of water, and the like, all of which involve complex and expensive equipment and are expensive to operate and maintain.

Accordingly, it is an object of this invention to provide a method for low-pressure storage of materials. It is another object of this invention to provide a method for maintaining a low-pressure storage facility at a constant storage temperature.

Other aspects, objects and the several advantages of the invention will be apparent to those skilled in the art from the description, the drawing, and the appended claims.

The drawing shows schematically a system embodying this invention.

In the drawing a liquid hydrocarbon containing at least one other liquid material which freezes at a temperature at or above the temperature at which the hydrocarbon is stored is passed by 1 into storage tank 2. The hydrocarbon can be olefins or diolefins, preferably conjugated diolefins, or other similar polymerizable hydrocarbon monomers or mixtures thereof. The second liquid material can be water, aqueous solutions, other hydrocarbons or mixtures of these materials. The amount of this second liquid material can vary widely but generally will be that amount which will form at least about three inches of said material in tank 2. The minimum amount of the second liquid material is determined by economics rather than technical feasibility of the invention. For the sake of simplicity, this second liquid material will hereinafter be referred to as water although from the above it is meant to be made clear that any type of material that fits the above description can be present instead of or in addition to water. Also, this second liquid material can be dispersed in the hydrocarbon to be stored or can be substantially immiscible therewith, thereby separating upon storage into a separate and distinct layer. Also, for the sake of simplicity and since the second liquid is to be described as water, the invention will be described in terms of the second liquid being substantially immiscible with the stored liquid even though the invention is not limited thereto.

Thus, an additive material which preferentially combines with water and lowers the freezing point thereof is added by 3 to the hydrocarbon and water stream 1 prior to storage in 2. The hydrocarbon forms a layer 4 and the water and preferentially combined additive from 3 form a separate and distinct layer 5. The additive can be any known material which will preferentially combine with the second liquid, water in this case, and will lower the freezing temperature of the water without substantially reacting either physically or chemically with the hydrocarbon that is to be stored. The amount of additive employed should be that sufficient to lower the freezing temperature of the water at least to the storage temperature. This amount will vary widely depending upon the materials and temperatures employed. Preferred additives include alkali metal and alkaline earth metal compounds such as the hydroxides, nitrites, nitrates, carbonates, and the like, of these metals. Preferred compounds are sodium hydroxide and sodium nitrite. It is to be understood that other materials both organic and inorganic can be employed in lieu of the inorganic compounds above mentioned. It is also to be understood that mixtures of two or more of the above inorganic compounds or other suitable materials can be employed. In the case of sodium hydroxide, from about 5 to about 28, preferably from about 10 to about 24, weight percent based upon the amount of water present can be employed. In the case of sodium nitrite, from about 5 to about 42, preferably from about 13 to about 38, weight percent based upon the amount of water present can be employed. Sodium nitrite is a particularly desirable material in that it not only inhibits corrosion but also inhibits the polymerization tendencies of polymerizable hydrocarbons such as butadiene. Also, aqueous solutions of sodium nitrite are more fluid than are aqueous solutions of similar salts. In the case of sodium hydroxide, this material is desirable in that it tends to deactivate any peroxides that can form which peroxides would tend to act as initiators in the polymerization of polymerizable hydrocarbons such as butadiene.

A part of the water and combined caustic layer 5 is removed from storage tank 2 by 6 through pump 7 and through chiller 8. The amount of aqueous caustic soda solution removed circulated through 6 can vary widely but will generally be at least 30 gallons per minute. Line 9 passes cool refrigerant through chiller 8 for indirect contact with the aqueous caustic soda solution to cool same. The amount of refrigerant passed through 9 and therefore the temperature to which the aqueous caustic soda solution is cooled is controlled by motor valve 10 which in turn is controlled through 11 by pressure controller 12. Pressure controller 12 is responsive to the pressure in storage tank 2 by means of line 13. Thus, if the pressure in storage tank 2 should go up thus indicating an increase in pressure of the material stored therein, pressure controller 12 will further open motor valve 10 thereby allowing more refrigerant to pass through chiller 8 thereby cooling the aqueous caustic soda solution passing therethrough more than before.

In order to ensure that the aqueous caustic soda solution passing through chiller 8 is not cooled below its freezing temperature, temperature controller 14 is operatively connected by 15 to the outflow of water and caustic solution from chiller 8 as represented by line 16. Temperature controller 14 is also connected by 17 to motor valve 18 in the outflow of chiller 8 as represented by 19. Thus, if the aqueous caustic soda solution passing through chiller 8 tends to be cooled below its freezing temperature, which temperature is the set point for temperature controller 14, motor valve 18 will be pinched down in order to build up the pressure of refrigerant in chiller 8 thereby decreasing the ability of that refrigerant to be vaporized and the amount of cooling effected by that refrigerant on the aqueous caustic soda solution in chiller 8.

It is to be noted that the instrumentation using pressure controller 12 and temperature controller 14 is one of several feasible instrumentation systems that can be employed in this invention. For example, the temperature of the cooled aqueous caustic soda solution can be controlled by controlling the amount of hydrocarbon vapors with which it is contacted.

Generally, the aqueous caustic soda solution, and similar combinations of the second material and additive, can be cooled to at least 3 and preferably at least 5° F. below the storage temperature before contacting same with the hydrocarbon vapors. Also, the rate of withdrawal and circulation of this solution is limited by only practical considerations and can vary from less than about 30 to 10,000 or more gallons per minute.

The cooled aqueous caustic soda solution is then passed to contactor 20 and therein contacted with hydrocarbon and other vapors from storage tank 2 as passed to contactor 20 by line 21. Contactor 20 can be any suitable apparatus such as a chamber having at least one separate spray nozzle therein, the cooled aqueous caustic soda solution from 16 being sprayed through the nozzle into contactor 20 and therefore into contact with vapors from storage tank 2. This contacting condenses, at least partially, the vapors thereby cooling same and creating a partial vacuum which pulls additional vapor from storage tank 2 through line 21. The condensed and cooled vapors and the cooled aqueous caustic soda solution is then passed from container 20 through 22 into storage tank 2.

The temperature to which the aqueous caustic soda solution must be cooled varies widely depending upon the materials in use but should be sufficiently below the storage temperature of storage tank 2 to ensure that after contact with vapors from storage tank 2 the resulting condensed vapors and aqueous caustic soda solution is at a temperature sufficiently below storage temperature to help cool the liquids stored in storage tank 2 and thereby maintain the storage temperature substantially constant. Thus, if additional warm hydrocarbon and water is being passed by 1 into storage tank 2, the pressure in storage tank 2 would increase thereby opening motor valve 10 and thereby cooling the aqueous caustic soda solution passing through chiller 8 to a lower temperature so that the condensed vapor and cooled aqueous caustic soda solution passing from contactor 20 into storage tank 2 will be cooler than before the warm hydrocarbon and water was added thereby lowering the temperature in storage tank 2 towards the desired storage temperature. Similarly, if no additional material is being added to storage tank 2 and no hydrocarbon is being withdrawn from storage tank 2 by 23, the only cooling demand will be to make up for heat absorbed from the surroundings and therefore the aqueous caustic soda solution passed through chiller 8 will be cooled to a lesser degree than if warm hydrocarbon and water were being added by 1. A similar cooling demand is placed on the system when hydrocarbon is being removed from storage tank 2 by 23.

It should also be noted that in lieu of external contactor 20 the cooled aqueous caustic soda solution from 16 can be sprayed directly into the top of storage tank 2 thereby condensing the vapors in situ.

The hydrocarbon removed from storage tank 2 by 23 being at substantially ambient pressure can be pumped directly into conventional ambient pressure transportation means such as cargo ships. Additional inhibitors such as tertiary butyl catechol and additional sodium hydroxide or other similar materials can be added to line 23 in order to ensure against subsequent degradation polymerization and freezing of the materials.

It should also be noted that either the quantity or temperature or both of the aqueous caustic soda solution can be varied in order to meet the cooling demands in storage tank 2. In the drawing a relatively fixed quantity of aqueous caustic soda solution is circulated continuously with the temperature of that solution being varied in response to varying cooling demands in storage tank 2. However, it is within the scope of this invention to also vary the quantity of aqueous caustic soda solution which is cooled by chiller 8 in response to cooling demands in storage tank 2 or to vary both the quantity and the temperature.

*Example*

In a conventional petroleum storage tank are stored 55,000 barrels of butadiene at a temperature of about 24° F. and a pressure of about 0.36 p.s.i.g. The butadiene is initially introduced to the storage tank containing about 90 p.p.m. water at 100° F. About 20 weight percent of sodium hydroxide based upon the amount of water present is added to the butadiene as it passes into the storage tank. The butadiene forms an upper layer and the water with the sodium hydroxide dissolved therein forms a lower layer in the storage tank. Caustic solution (20 weight percent) is added, e.g. via line 3, to the tank to maintain at least 6 inches of caustic solution therein. This is about 700 to 1000 barrels.

The aqueous caustic soda solution is removed from the storage tank at a rate sufficient to keep about 6 inches of said solution in the tank at all times and is passed through an indirect heat exchange chiller and cooled to a temperature of about 8° F. This cooled aqueous caustic soda solution then passes into contact with vapor from the top of the storage tank and is returned together with condensed vapor to the storage tank at a temperature of about 24° F.

Reasonable variations and modifications are possible within the scope of this disclosure without departing from the spirit and scope thereof.

I claim:

1. A method for low pressure-low temperature storage of a first liquid that contains a substantial amount of a second liquid that tends to at least become viscous, at the storage temperature and pressure of said first liquid which comprises storing said liquids at a low pressure of less than about 1 p.s.i.g. and at a temperature that prevents substantial vaporization of said first liquid, adding to said liquids a material which preferentially combines with said second liquid and in an amount which lowers the solidifying temperature of said second liquid at least to the storage temperature, removing a part of at least said second liquid and combined material from the stored liquids, cooling said removed part to a temperature substantially below the storage temperature, utilizing said cooled removed part to condense vapors of at least said first liquid and to cool said stored liquids.

2. The method according to claim 1 wherein said first and second liquids are immiscible and said part which is removed and cooled before being utilized to condense vapors of said first liquid and then to cool the stored liquids consists essentially of said second liquid and said preferentially combinable material.

3. A method for low pressure-low temperature storage of a liquid hydrocarbon that contains a substantial amount of at least one of an aqueous and hydrocarbon second liquid that tends to solidify at the storage temperature and pressure of the hydrocarbon which comprises storing said liquid at a pressure less than 1 p.s.i.g. and at a temperature that prevents substantial vaporization of said liquid hydrocarbon at that pressure, adding to said hydrocarbon and second liquid an additive material selected from the group consisting of the hydroxides, nitrites, nitrates, and carbonates of at least one of alkali metals and alkaline earth metals and which preferentially combines with said second liquid, said additive being added in an amount which lowers the solidifying temperature of said second liquid substantially below the storage temperature, removing a part of at least said second liquid and combined additive from the stored liquids, cooling said removed part to a temperature substantially below the storage temperature, removing vapors of the stored liquids and contacting same with said cooled removed part to at least partially condense said vapors, returning said condensed vapors and cooled removed part to the stored liquid to control the temperature thereof.

4. The method according to claim 3 wherein at least one of the rate of removal of said part of said second liquid and the degree of cooling of same is adjusted so that the amount and temperature of said condensed vapors and said cooled removed part returned to the stored liquids maintains said stored liquids at the storage temperature.

5. The method according to claim 4 wherein said second liquid is water and said material is sodium hydroxide.

6. The method according to claim 4 wherein said second liquid is water and said material is sodium nitrite.

7. A method for low pressure-low temperature storage of butadiene that contains a substantial amount of water which comprises storing said butadiene at a pressure of less than 1 p.s.i.g. and at a temperature of about 24° F., adding to said butadiene and water as it is introduced into the storage zone from about 5 to about 28 weight percent of sodium hydroxide based upon the amount of water present, continuously removing a portion of the aqueous caustic soda solution from the storage zone, cooling said removed portion to a temperature from about 5 to about 10° F., removing vapors of at least the stored butadiene and contacting same with said cooled water and sodium hydroxide solution to at least partially condense said vapors, returning said condensed vapors and cooled removed aqueous caustic soda solution to the storage zone, adjusting the temperature to which the removed aqueous caustic soda solution is cooled so that the amount and temperature of said condensed vapors and said cooled removed aqueous caustic soda solution returned to the storage zone is sufficient to maintain said stored liquids substantially at 24° F. under normal operating conditions.

8. The method according to claim 7 wherein said caustic soda is present in an amount of about 20 weight percent based upon the amount of water present and the amount of said aqueous caustic soda solution is that amount sufficient to form at least about 3 inches in the storage zone.

9. A method for low pressure-low temperature storage of butadiene that contains a substantial amount of water which comprises storage said butadiene at a pressure of less than 1 p.s.i.g. and at a temperature of about 24° F., adding to said butadiene and water as it is introduced into the storage zone from about 5 to about 42 weight percent sodium nitrite based upon the amount of water present, continuously removing a portion of the aqueous sodium nitrite solution from the storage zone, cooling said removed portion to a temperature from about 5 to about 10° F., removing vapors of at least the stored butadiene and contacting same with said cooled aqueous sodium nitrite solution to at least partially condense said vapors, returning said condensed vapors and cooled removed aqueous sodium nitrite solution to the storage zone, adjusting the temperature to which the removed aqueous sodium nitrite solution is cooled so that the amount and temperature of said condensed vapors and said cooled removed aqueous sodium nitrite solution returned to the storage zone is sufficient to maintain said stored liquids substantially at 24° F. under normal operating conditions.

References Cited by the Examiner

UNITED STATES PATENTS

| | | | |
|---|---|---|---|
| 2,880,593 | 4/1959 | Johnson et al. | 62—45 |
| 3,083,537 | 4/1963 | Dougherty | 62—45 X |
| 3,096,625 | 7/1963 | Legatski | 62—54 |
| 3,191,395 | 6/1965 | Maher et al. | 62—54 |

LLOYD L. KING, *Primary Examiner.*